(12) United States Patent
Takei et al.

(10) Patent No.: US 9,039,813 B2
(45) Date of Patent: May 26, 2015

(54) EXHAUST GAS TREATMENT APPARATUS

(75) Inventors: Noboru Takei, Kanagawa (JP); Sohsuke Kido, Kanagawa (JP); Naohiro Kaji, Kanagawa (JP); Akira Kumagai, Kanagawa (JP)

(73) Assignee: CHIYODA CORPORATION, Yokohama (JP)

( * ) Notice: Subject to any disclaimer, the term of this patent is extended or adjusted under 35 U.S.C. 154(b) by 528 days.

(21) Appl. No.: 13/503,885

(22) PCT Filed: Oct. 21, 2010

(86) PCT No.: PCT/JP2010/068601
§ 371 (c)(1),
(2), (4) Date: Jul. 3, 2012

(87) PCT Pub. No.: WO2011/052477
PCT Pub. Date: May 5, 2011

(65) Prior Publication Data
US 2012/0267806 A1    Oct. 25, 2012

(30) Foreign Application Priority Data

Oct. 26, 2009  (JP) ................................. 2009-245478

(51) Int. Cl.
*B01D 53/14* (2006.01)
*B01D 53/50* (2006.01)
*B01D 53/78* (2006.01)
*F23J 15/02* (2006.01)

(52) U.S. Cl.
CPC .............. *B01D 53/504* (2013.01); *B01D 53/78* (2013.01); *B01D 2251/404* (2013.01); *B01D 2251/606* (2013.01); *B01D 2257/302* (2013.01); *B01D 2258/0283* (2013.01); *F23J 15/02* (2013.01); *F23J 2215/20* (2013.01); *F23J 2219/40* (2013.01)

(58) Field of Classification Search
None
See application file for complete search history.

(56) References Cited

U.S. PATENT DOCUMENTS 3,791,109 A * 2/1974 Gustavsson ...................... 96/237
4,152,407 A * 5/1979 Fuchs ............................ 423/360
2012/0273979 A1* 11/2012 Takei et al. ..................... 261/74

FOREIGN PATENT DOCUMENTS

| JP | 8-71366 A | 3/1996 |
| JP | 8-206435 A | 8/1996 |
| JP | 9-239236 A | 9/1997 |
| JP | 9-239237 A | 9/1997 |
| JP | 2004-82037 A | 3/2004 |

OTHER PUBLICATIONS

International Search Report of PCT/JP2010/068601, dated Jan. 11, 2011, (2 pages).

* cited by examiner

*Primary Examiner* — Duane Smith
*Assistant Examiner* — Pankti Patel
(74) *Attorney, Agent, or Firm* — Westerman, Hattori, Daniels & Adrian, LLP

(57) ABSTRACT

The exhaust gas treatment apparatus has a sealed vessel which is vertically partitioned into two spaces by a partition. A portion of the sealed vessel lower than the partition is an absorbing liquid storage portion, and a portion of the sealed vessel upper than the partition is an exhaust gas introducing portion. The partition is provided with a large number of sparger pipes so that the sparger pipes reach inside an absorbing liquid stored in the absorbing liquid storage portion. The partition is provided with a single gas riser in communication with a space upper than the absorbing liquid in the absorbing liquid storage portion. An upper end of the gas riser passes through a top plate portion of the sealed vessel and protrudes upward.

5 Claims, 3 Drawing Sheets

EXHAUST GAS TREATMENT APPARATUS

TECHNICAL FIELD

The present invention relates to an exhaust gas treatment apparatus which removes sulfur oxides in flue gas (combustion exhaust gas).

BACKGROUND ART

For example, in facilities such as thermal power plants where flue gas as combustion exhaust gas is produced, an exhaust gas treatment apparatus (desulfurization apparatus) treating exhaust gas in fuel gas is provided for the purpose of preventing air pollution due to flue gas containing sulfur oxide ($SO_x$) such as sulfurous acid gas ($SO_2$).

As a kind of such an exhaust gas treatment apparatus, there has been widely known one in which sulfurous acid gas ($SO_2$) contained in exhaust gas is in contact with an absorbing liquid consisting of an aqueous solution (sulfurous acid gas neutralizer slurry solution) dissolved or suspended with limestone ($CaCO_3$) and reacted and absorbed in the absorbing liquid (for example, see Patent Literature 1).

FIG. 5 shows a configuration of a main portion of this type of conventional desulfurization apparatus. A sealed vessel (absorption tower) 1 constituting the main portion of the desulfurization apparatus has an upper stage deck (upper partition) 3 and a lower stage deck (lower partition) 2 arranged vertically at a distance from each other. The decks 2 and 3 are provided as partitions defining an inlet gas introducing space of the sealed vessel 1. A lower space of the lower stage deck 2 serves as an absorbing liquid storage portion (storage vessel) 4, a space between the upper stage deck 3 and the lower stage deck 2 is an exhaust gas introducing portion 6, and an upper space of the upper stage deck 3 serves as an exhaust gas deriving portion 8. The absorbing liquid storage portion 4 stores therein an absorbing liquid K, consisting of aqueous slurry of limestone, at a predetermined liquid level. An exhaust gas introducing portion 6 is connected to an inlet duct 5 through which exhaust gas is introduced into the sealed vessel 1, and the exhaust gas deriving portion 8 is connected to an outlet duct 7 through which treated exhaust gas in the sealed vessel 1 is derived outside. The inlet duct 5 is provided with a gas cooling portion 17 which circulates and supplies a portion of the absorbing liquid K from a cooling line 11 by means of a pump 13 and is equipped with spray nozzles 16 for spraying the absorbing liquid as cooling water against the introduced exhaust gas and cooling the exhaust gas.

A larger number of openings (through-holes) are dispersively bored in the lower stage deck 2, and the through-holes are connected to upper end portions of the sparger pipes 9 hanging on a lower surface of the lower stage deck 2. The sparger pipes 9 extend downward, and their lower ends are inserted into the absorbing liquid K in the absorbing liquid storage portion 4 so that exhaust gas is ejected and dispersed under a liquid level of the absorbing liquid K.

Gas risers 10 placing an upper space 4a above the liquid level of the absorbing liquid in the absorbing liquid storage portion 4 in communication with the exhaust gas deriving portion 8 are provided between the lower stage deck 2 and the upper stage deck 3 so as to pass through the exhaust gas introducing portion 6. An air supply pipe (not shown) through which oxidation air is ejected and a mixer (not shown) for mixing the absorbing liquid K are provided on the bottom portion side of the absorbing liquid storage portion 4, and a blower (not shown) for pressure feeding air is connected to a base end side of the supply pipe.

The sealed vessel 1 is connected to a supply line for supplying an absorbing liquid for supply (limestone as an absorbent) into the sealed vessel 1.

A spray nozzle 18 is disposed above the sparger pipe 9 in order to wash out gypsum adhered to a surface of the gas riser 10 as described later and a mass of gypsum dropped on the sparger pipe 9 from the gas riser 10, and spray nozzles 19 are disposed around the gas riser 10. A filtrate obtained when gypsum is separated from the absorbing liquid as described later is supplied to the spray nozzles 18 and 19 through a pipe and intermittently sprayed.

In the sealed vessel 1 having the above constitution, when exhaust gas is fed from the inlet duct 5 to the exhaust gas introducing portion 6 while oxygen (air) is supplied into the absorbing liquid K through the supply pipe, the exhaust gas is ejected from ejection holes of the lower ends of the sparger pipes 9 and violently mixed with the absorbing liquid K, and a liquid phase continuous froth layer (jet bubbling layer) is formed. At this time, the mixer is rotated to mix the absorbing liquid K, and, at the same time, oxidation air supplied from the supply pipe is continuously supplied into the absorbing liquid K from a nozzle at a tip end of the supply pipe. Consequently, highly efficient gas-liquid contact is performed in the froth layer, and as shown by $SO_2+CaCO_3+1/2O_2+H_2O \rightarrow CaSO_4 \cdot 2H_2O \downarrow + CO_2 \uparrow$, sulfurous acid gas ($SO_2$) contained in exhaust gas is oxidized. At the same time, a reaction in which sulfurous acid gas is neutralized with limestone in the absorbing liquid K takes place, and the sulfurous acid gas is absorbed and removed. Exhaust gas thus desulfurized reaches the exhaust gas deriving portion 8 through the gas risers 10 from a space above the liquid level of the absorbing liquid storage portion 4 (above the froth layer) to be passed through the outlet duct 7 from the exhaust gas deriving portion 8, and, thus, to be discharged outside from an exhaust flue. The outlet duct 7 is provided with an eliminator (not shown) which removes mist (water droplets) containing the above-described slurry.

On the lower stage deck 2, a large number of through-holes are substantially evenly dispersed and arranged as described above, and the sparger pipes 9 are provided in the respective through-holes. Further, the gas risers 10 are substantially evenly dispersed and arranged so that the gas riser 10 is arranged for each of the substantially predetermined number of the sparger pipes 9, and several hundred gas risers 10 may be provided, for example, although the number is one figure lower than the number of the sparger pipes 9.

CITATION LIST

Patent Literature

Patent Literature 1: Japanese Patent Application Laid-Open No. 8-206435

SUMMARY OF THE INVENTION

Technical Problem

In the above-described desulfurization apparatus (exhaust gas treatment apparatus), the many gas risers in communication with the upper space of the absorbing liquid storage portion are provided between the lower stage deck and the upper stage deck, desulfurized exhaust gas flows into the exhaust gas deriving portion on the upper stage deck by the gas risers, exhaust gas is discharged from the exhaust gas deriving portion to the outlet duct provided outside the sealed vessel, and mist is removed by an eliminator provided at the outlet duct.

Accordingly, the many gas risers are provided, and gases discharged from the gas risers are collected in the exhaust gas deriving portion to be derived to an exhaust flue through the eliminator of the outlet duct extending in a horizontal direction, whereby a complex structure is provided, so that it is difficult to reduce construction cost.

For a member in the sealed vessel, FRP (fiber-reinforced plastic) using a synthetic resin is largely used, for example, because exhaust gas and an absorbing liquid exhibit corrosivity with respect to metal. Thus, if high-temperature exhaust gas is introduced as it is, a member formed of FRP is affected by heat. Therefore, a slurry-like absorbing liquid containing gypsum is circulated and supplied to a gas cooling portion of the inlet duct, and, at the same time, this absorbing liquid (circulating liquid) is splayed from a spray nozzle, whereby exhaust gas introduced into the sealed vessel is humidified and cooled.

However, the absorbing liquid used for cooling contains a large amount of granular gypsum, so that there is a problem that gypsum contained in the sprayed absorbing liquid is adhered to a surface of the gas riser of the exhaust gas introducing portion in the exhaust gas introduction. The number of the gas risers is large, and an interval between the gas risers is small because the number of the gas risers is large, so that there is a problem that it is difficult to remove the adhered gypsum. Although the spray nozzles are arranged in order to remove gypsum, the pipe arrangement has a complex structure, and this causes increase in construction cost. Even if such a structure is employed, it is difficult to remove gypsum completely.

In maintenance in the sealed vessel, operation may be difficult because a large number of gas risers are provided on a lower stage deck. Further, the outlet duct extends in a horizontal direction, and the eliminator is disposed on the outlet duct side, so that there is a problem that an area occupied by the exhaust gas treatment apparatus is increased.

Since the sealed vessel is vertically partitioned by the lower stage deck 2 and the upper stage deck 3, the exhaust gas treatment apparatus has a three layer structure. For example when a motor as a drive source for rotating blades of the above-mentioned mixer is provided above the sealed vessel, a drive shaft of the mixing blades reaches the mixing blades in the absorbing liquid in the absorbing liquid storage portion through the exhaust gas deriving portion and the exhaust gas introducing portion. In this constitution, the length of the drive shaft is increased, and the weight of the long drive shaft is increased, so that a large driving force is required.

In view of the above circumstances, the invention provides an exhaust gas treatment apparatus which can reduce construction cost and enhance maintenance by simplifying the structure of the exhaust gas treatment apparatus.

Solution to Problem

In order to achieve the above object, an exhaust gas treatment apparatus according to claim 1 is provided with an sealed vessel in which exhaust gas is introduced and treated, a partition which vertically divides the inside of the sealed vessel, an absorbing liquid storage portion which is provided on the lower side of the partition of the sealed vessel and stores an absorbing liquid for desulfurization absorbing sulfur oxides from exhaust gas, an exhaust gas introducing portion which is provided on the upper side of the partition of the sealed vessel and introduces therein exhaust gas from an outside of the sealed vessel, a plurality of sparger pipes which are in communication with the exhaust gas introducing portion, extends inside the absorbing liquid stored in the lower absorbing liquid storage portion from the partition, and ejects and disperses exhaust gas in the absorbing liquid from the exhaust gas introducing portion, and a gas riser which is in communication with a space upper than the absorbing liquid in the absorbing liquid storage portion and extends upward from the partition to pass through the exhaust gas introducing portion. In the exhaust gas treatment apparatus, the gas riser is provided to extend to the outside of the sealed vessel upper than the exhaust gas introducing portion, and treated exhaust gas is derived outside the sealed vessel by the gas riser.

In the invention according to claim 1, the sealed vessel is vertically divided into two layers by a single partition, the gas riser passes through the exhaust gas introducing portion on the partition and extends to the outside of the sealed vessel, and the treated exhaust gas is derived outside the sealed vessel, whereby the structure of the exhaust gas treatment apparatus can be simplified.

In the prior art, upper and lower two partitions are provided in the sealed vessel. A gas riser derives treated exhaust gas from an upper space of an absorbing liquid storage portion lower than the lower partition to an exhaust gas deriving portion upper than the upper partition, and the treated exhaust gas is derived outside the sealed vessel from the exhaust gas deriving portion through an outlet duct. Meanwhile, in the present invention, the treated exhaust gas is derived outside the sealed vessel by the gas riser without interposition of the exhaust gas deriving portion as described above.

Accordingly, the upper and lower two partitions in the prior art may be a single partition, and construction cost can be reduced by simplifying the structure of the exhaust gas treatment apparatus.

Since the exhaust gas deriving portion above the exhaust gas introducing portion is not required to be provided, the height of an upper portion (ceiling portion) except for the gas riser and the eliminator can be reduced. Consequently, when the drive source of the mixer of the liquid absorbing storage portion is disposed above the sealed vessel, because a distance of the drive shaft between the mixing blades and the drive source is reduced and the weight of the drive shaft is reduced, the driving force can be reduced. Namely, a drive source having a lower output than that of the prior art is available, and cost reduction can be realized.

It is preferable that the number of the gas risers is small. For example, the number of the gas risers is preferably twenty or less, and several or one gas riser may be provided.

The exhaust gas treatment apparatus according to claim 2 is the exhaust gas treatment apparatus in the invention according to claim 1 which is provided with an eliminator which is provided at an upper end of the gas riser and removes droplets from treated exhaust gas rising in the gas riser in which the treated exhaust gas is derived from the gas riser through the eliminator.

In the invention according to claim 2, the gas riser extends upward outside the sealed vessel, and the eliminator is provided at the upper end of the gas riser. Therefore, a portion which derives exhaust gas outside the sealed vessel is provided above the sealed vessel, and the eliminator and the exhaust gas deriving portion are arranged so as to vertically overlap each other at the same portion as the sealed vessel. According to this constitution, an area required for installation of the exhaust gas treatment apparatus is reduced, and the space efficiency can be enhanced. Namely, in the prior art, the outlet duct extends in the horizontal direction of the sealed vessel, and, at the same time, the eliminator is provided at the outlet duct; therefore, an occupied area of the exhaust gas treatment apparatus is large due to the outlet duct and the eliminator. However, in the present invention, the occupied area of the exhaust gas treatment apparatus can be reduced.

The exhaust gas treatment apparatus according to claim 3 is the exhaust gas treatment apparatus in the invention according to claim 1 or 2 in which only the single gas riser is provided in the single sealed vessel.

In the invention according to claim 3, since only the single gas riser is provided, in comparison with a case where a large number of gas risers are provided, the gas riser can be extremely easily maintained, such as cleaning, and, at the same time, the structure of the exhaust gas treatment apparatus is extremely simplified. Consequently, the construction cost and cost required for maintenance can be significantly reduced.

In particular, a cleaning device (pipe which feeds a cleaning liquid, a nozzle which ejects the cleaning liquid, and so on) used for cleaning the inside of the gas introducing portion can be easily established, so that the construction cost can be reduced. Further, detergency can be easily improved in comparison with the case where a large number of gas risers are provided, and labor saving of maintenance can be realized by performance of detergency.

The exhaust gas treatment apparatus according to claim 4 is the exhaust gas treatment apparatus in the invention according to any one of claims 1 to 3 in which the gas riser is joined to the partition, and a cross-sectional area of the upper end at which the eliminator is provided is larger than the cross-sectional area of the lower end in communication with the absorbing liquid storage portion under the partition.

In the invention according to claim 4, the cross-sectional area of the gas riser is determined by the flow rate of exhaust gas introduced into a sealed vessel, the flow rate of exhaust gas (design speed of the eliminator) that can be treated by the eliminator provided at the upper end of the gas riser, and the number of gas risers. If the actual cross-sectional area is smaller than the cross-sectional area thus determined, droplet removal efficiency in the eliminator may be lowered. However, when the cross-sectional area of the upper end of the gas riser is larger than that of the lower end, the cross-sectional area of the gas riser in the partition can be reduced, corresponding to the design speed of the eliminator.

Namely, since the cross-sectional area of the upper end at which the eliminator is provided is large, even if the cross-sectional area of the lower end of the gas riser is smaller than a cross-sectional area satisfying the design speed of the eliminator (flow rate of exhaust gas), the flow rate of exhaust gas is reduced in the gas riser having a large cross-sectional area, and the flow rate of exhaust gas can be suppressed within the design speed of the eliminator.

In the partition connected to the lower end of the gas riser, if the cross-sectional area of the lower end of the gas riser is reduced, the area occupied by the gas riser in the partition is reduced. Consequently, the area where the sparger pipes of the partition can be arranged is increased, and a greater number of the sparger pipes can be arranged. Since the required number of the sparger pipes is determined by the amount of exhaust gas to be treated, when the required number of the sparger pipes are arranged, the area of the partition can be reduced according to the amount of reduced area occupied by the gas riser on the partition. Namely, the required cross-sectional area of the sealed vessel can be reduced with respect to the amount of exhaust gas to be treated, and the exhaust gas treatment apparatus can be reduced in size.

The exhaust gas treatment apparatus according to claim 5 is the exhaust gas treatment apparatus in the invention according to any one of claims 1 to 4 in which the gas riser includes a distribution plate which suppresses a deviation of gas flow in the gas riser.

In the invention according to claim 5, when the number of gas risers is reduced and the diameter of the gas riser is increased, the flow rate of exhaust gas in the gas riser is increased, and the flow rate of exhaust gas in the center of the gas riser cross section is increased by a deviation of gas flow, whereby pressure loss occurs, or entrainment is increased. Further, the inlet velocity of exhaust gas at the center portion of the eliminator connected to the upper end of the gas riser is increased. Thus, the distribution plate is disposed in the gas riser to suppress a deviation of gas flow, whereby the velocity of exhaust gas in the gas riser is prevented from being partially increased, and the flow rate increased partially is lowered, whereby it is possible to prevent pressure loss and reduce entrainment. In the present invention, the eliminator is directly attached to the gas riser, whereby since a deviation of gas flow in the gas riser directly affects the eliminator, measures against a deviation of gas flow act effectively.

Advantageous Effects of Invention

According to the present invention, the structure of the exhaust gas treatment gas apparatus is simplified, whereby it is possible to reduce the construction cost and simplify maintenance.

DESCRIPTION OF EMBODIMENTS

Figure 1:
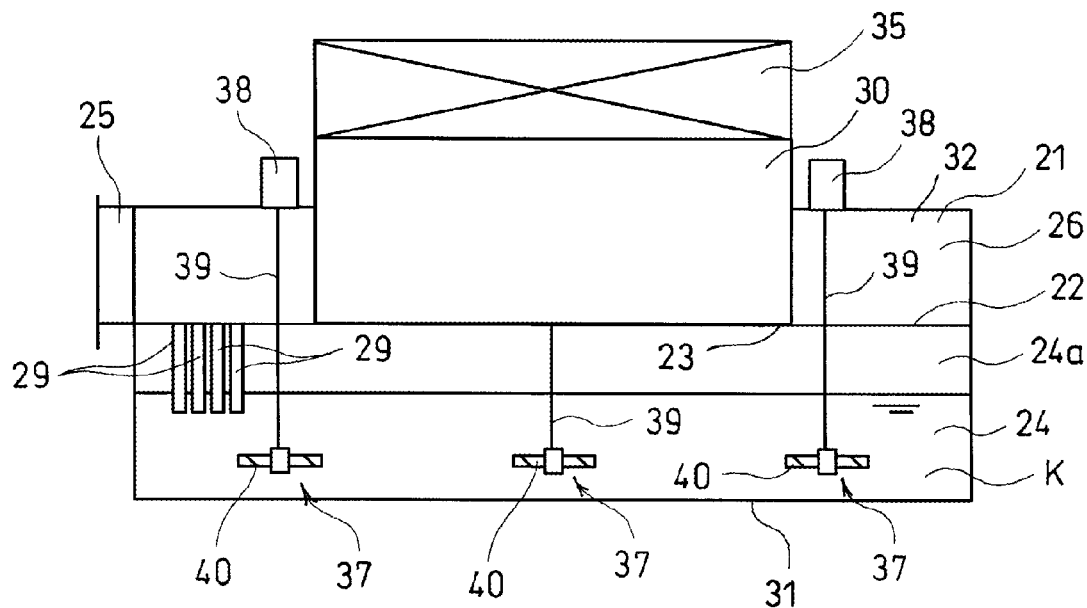
FIG. 1 is a schematic view showing an exhaust gas treatment apparatus according to a first embodiment of the present invention.
Figure 2:
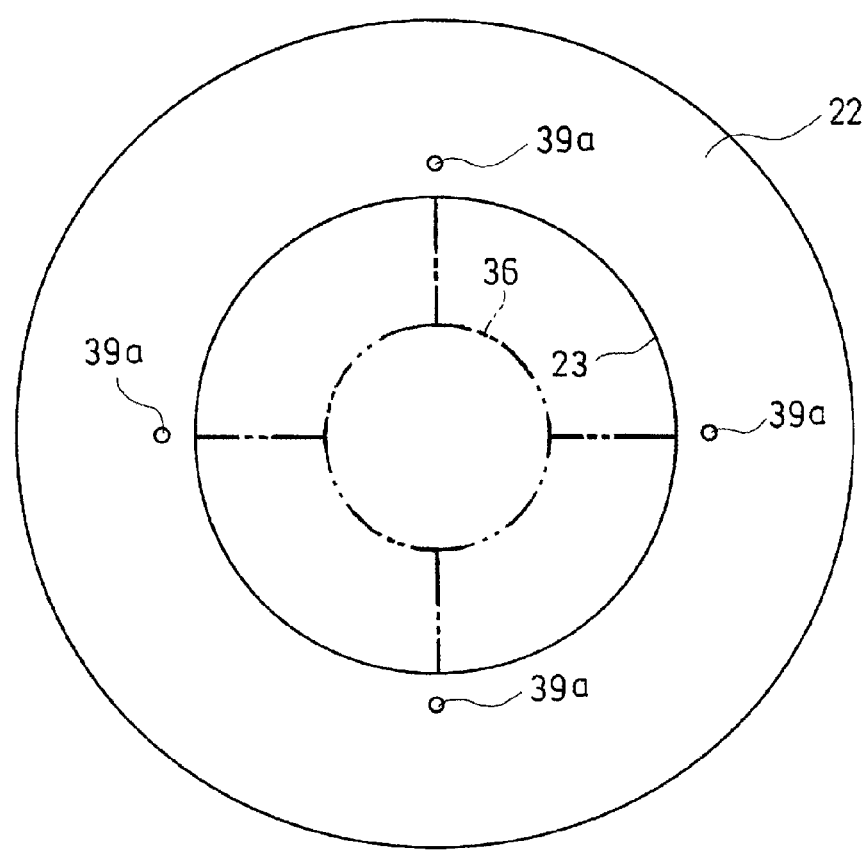
FIG. 2 is a plan view showing a partition of the exhaust gas treatment apparatus.

Hereinafter, embodiments according to the present invention will be described with reference to the drawings. FIG. 1 is a schematic view showing an exhaust gas treatment apparatus according to an embodiment of the present invention. FIG. 2 is a plan view showing a partition of the exhaust gas treatment apparatus.

In a conventional exhaust gas treatment apparatus, a sealed vessel is vertically partitioned into three spaces by vertically provided two partitions, while, as shown in FIG. 1, a sealed vessel 21 of the exhaust gas treatment apparatus in this example is vertically separated into two spaces by a single partition (deck) 22.

Although the sealed vessel 21 in this example is formed into a cylindrical shape with a bottom plate and a top plate, for example, it may be formed into a square cylindrical shape (rectangular solid shape and square solid shape) with a bottom plate and a top plate.

A portion of the sealed vessel 21 lower than the partition 22 is an absorbing liquid storage portion 24, and a portion of the sealed vessel 21 upper than the partition 22 is an exhaust gas introducing portion 26. The lower side of the absorbing liquid storage portion 24 is a bottom portion 31 of the sealed vessel 21, and the upper side of the exhaust gas introducing portion 26 is a top plate portion (lid portion) 32 of the sealed vessel 21.

In this example, the partition 22 is formed into a disk shape, and a large circular hole 23 connected to the single gas riser 30 is formed in a central portion of the partition 22. The area of the hole 23 is, for example, approximately ⅓ of the area of the entire partition 22 including the opening. The outer circumference of the disk-shaped partition 22 and the inner circumference of the partition 22 (the outer circumference of the hole 23) are arranged coaxial with each other (concentrically).

The partition 22 has a large number of through-holes (not shown) substantially evenly dispersed and formed at a portion outside the hole 23, and sparger pipes 29 are suspended in the through-holes so as to extend downward from the partition 22. The sparger pipes 29 are provided so as to reach from the partition 22 to an inside of the absorbing liquid K stored in the absorbing liquid storage portion 24 under the partition 22. In FIG. 1, although only a portion of the sparger pipe 29 is illustrated, in fact, the sparger pipe 29 are provided so as to be dispersed on substantially the entire surface of the partition 22 except for the hole 23 of the partition 22.

Further, the partition 22 has through-holes 39a through which a driving shaft 39 of a mixer 37 to be described later passes.

The flow rate of exhaust gas in the sparger pipe 29 is preferably 2 m/s to 20 m/s, for example.

The gas riser 30 is provided at a portion corresponding to the disk-shaped hole 23 of the partition 22 so that the hole 23 and the lower end of the gas riser 30 overlap each other. The gas riser 30 is formed into a cylindrical shape. The lower end of the gas riser 30 is fixed to the partition 22 to be disposed in such a state that the hole 23 is closed by the upper side of the partition 22. The gas riser 30 is in a state of being in communication with an upper space 24a above the liquid level of the absorbing liquid in the absorbing liquid storage portion 24 through the hole 23.

The upper end of the gas riser 30 passes through the top plate portion 32 of the sealed vessel 21 in a state of passing through the exhaust gas introducing portion 26 and projects upward from the top plate portion 32.

The inside of the gas riser 30 is isolated from the exhaust gas introducing portion 26 and, at the same time, is in communication with the upper space of the absorbing liquid storage portion 24 through the hole 23 of the partition 22.

In this example, when the cross-sectional area (plane projection surface area) of the sealed vessel 21 is S1 and the cross-sectional area (plane projection surface area) of the gas riser 30 is S2, a ratio (S2/S1) of the cross-sectional area S2 of the gas riser 30 to the cross-sectional area S1 of the sealed vessel 1 is preferably 0.15 to 0.40, more preferably 0.2 to 0.35.

In the partition 22 shown in FIG. 2, the entire area including the hole 23 of the partition 22 substantially corresponds to the cross-sectional area S1 of the sealed vessel 21, and the area of the hole 23 substantially corresponds to the cross-sectional area S2 of the gas riser 30. The area obtained by subtracting the cross-sectional area S2 from the cross-sectional area S1 substantially corresponds to the actual area not including the hole 23 of the partition 22. Accordingly, the area obtained by subtracting the cross-sectional area S2 from the cross-sectional area S1 is the area capable of arranging the sparger pipes 29, and the amount of exhaust gas treated per unit time that can be treated in the exhaust gas treatment apparatus is limited by this area.

If the above ratio S2/S1 increases, when the inflow of exhaust gas per unit time is constant, the flow rate in the gas riser 30 is reduced, and the area capable of installing the sparger pipes 29 of the partition 22 is reduced.

Accordingly, when S2/S1 is more than 0.35, and particularly when S2/S1 is more than 0.40, the area capable of installing the sparger pipes 29 of the partition 22 is reduced, and the amount of exhaust gas to be treated with respect to the occupied area of the sealed vessel 21 is reduced to deteriorate the space efficiency of the sealed vessel 21, and thus it is not preferable.

When S2/S1 is reduced, the area capable of installing the sparger pipes 29 of the partition 22 is increased. However, the cross-sectional area of the gas riser 30 is reduced, so that when the amount of exhaust gas introduced per unit time is constant, the flow rate of exhaust gas in the gas riser 30 may be excessively high.

Accordingly, when S2/S1 is less than 0.20, and particularly when S2/S1 is less than 0.15, the flow rate in the gas riser 30 is increased, and increase in entrainment and pressure loss occurs according to the design speed of the eliminator 35 in a state of covering the upper end opening of the gas riser 30 to be described later, and thus it is not preferable. Since a deviation of gas flow is generated in the gas riser 30, the flow rate in the central portion of the cross section of the gas riser 30 is higher than the flow rate around the central portion, and this may lead to increase in entrainment and pressure loss. As described above, S2/S1 is preferably not less than 0.15, more preferably not less than 0.20.

When an equivalent diameter of the cross-sectional area of the gas riser 30 is D2 and a vertical length of the gas riser 30 (length along the vertical direction) is L2, a ratio (L2/D2) of the vertical length L2 of the gas riser 30 to the equivalent diameter D2 of the gas riser 30 is preferably 0.3 to 1.0, more preferably 0.4 to 0.6.

The equivalent diameter is a diameter calculated by using the circular constant, regarding the cross-sectional area as an area of a circle when the cross-sectional shape is not a circle and a diameter calculated from the cross-sectional area itself when the cross-sectional shape is a circle. The cross-sectional shape of the sealed vessel 21 is not required to be a circle but may be a square or other polygonal shape, and the cross-sectional shape of the gas riser 30 is not required to be a circle but may be a square or other polygonal shape. Further, those cross-sectional shapes may be a rugged shape partially.

If L2/D2 is reduced, that is, if the vertical length L2 of the gas riser 30 is reduced to the equivalent diameter D2 (cross-sectional area) of the gas riser 30, the influence of a deviation of gas flow becomes large, and the flow rate of exhaust gas in the central portion of the cross section of the gas riser 30 becomes high as described above, so that entrainment and pressure loss are increased.

If L2/D2 is increased, the influence of a deviation of gas flow can be reduced, and therefore, basically, the larger L2/D2 is, the more preferable it is. However, as described above, the size of the cross-sectional area S2 of the gas riser 30 corresponding to the equivalent diameter D2 of the gas riser 30 is limited by the relationship with the cross-sectional area S1 of the sealed vessel 21. Therefore, if L2/D2 is increased, the vertical length L2 of the gas riser 30 is substantially increased. Namely, since the height of the gas riser 30 is increased, the gas riser 30 and strength of a structure supporting the gas riser 30 may be structurally insufficient. If the structure of the gas riser 30 is strengthened to enhance the strength, the construction cost of the sealed vessel 21 including the gas riser 30 may be increased.

Accordingly, L2/D2 is preferably more than 0.3 in order to reduce a deviation of gas flow, more preferably more than 0.4. From the viewpoint of reduction of the influence of a deviation of gas flow, although it is preferable that L2/D2 is as large as possible, L2/D2 is preferably less than 1.0, considering to increase in construction cost of the sealed vessel 21 due to increase in the height of the gas riser 30, and more preferably less than 0.6, considering to a relationship between cost and performance.

Further, when the equivalent diameter of the cross section of the sealed vessel 21 is D1 and a distance between the partition 22 and the liquid level of the absorbing liquid in the absorbing liquid storage portion 24, that is, a vertical length of the upper space 24a upper than the absorbing liquid of the absorbing liquid storage portion 24 is L1, a ratio (L1/D1) of the vertical length L1 of the upper space 24a of the absorbing liquid storage portion 24 to the equivalent diameter D1 of the sealed vessel 21 is preferably 0.05 to 0.2, more preferably 0.06 to 0.1.

If L1/D1 is increased, a deviation of gas flow in the gas riser 30 can be suppressed. Accordingly, it is preferable that L1/D1 is as large as possible, considering to the influence of the deviation of gas flow. However, if L1/D1 is increased, the magnitude of D1 determining the size of the cross section of the sealed vessel 21 cannot be reduced too much, considering to the amount of exhaust gas to be treated, and therefore, L1 becomes large. The amount of the absorbing liquid K cannot be reduced too much according to the amount of exhaust gas to be treated, and it is difficult to reduce the depth of the absorbing liquid K to not less than some extent. Thus, in order to increase L1/D1, the distance L1 between the partition 22 and the liquid level of the absorbing liquid K is required to be increased. In this case, the height of the absorbing liquid storage portion 24 is increased.

The sparger pipe 29 is required to extend from the partition 22 more downward than the liquid level of the absorbing liquid K and be longer than the distance L1 between the partition 22 and the liquid level of the absorbing liquid K. If L1 is increased to increase L1/D1 as described above, the length of the sparger pipe 29 is increased. In the exhaust gas treatment apparatus, since a large number of the sparger pipes 29 are provided, if the length of all the sparger pipes increase, the construction cost of the sealed vessel 21 is increased.

Accordingly, when L1/D1 is less than 0.06 and, in particular, less than 0.05, the influence of a deviation of gas flow in the gas riser 30 becomes large, so that the problems due to the deviation of gas flow occur.

Meanwhile, when L1/D1 is more than 0.1 and, in particular, more than 0.2, the height of the absorbing liquid storage portion 24 is increased as described above, and, at the same time, the length of the sparger pipes 29 is increased, so that the construction cost of the exhaust gas treatment apparatus is increased.

The upper end of the gas riser 30 upper than the top plate portion 32 of the sealed vessel 21 is connected to the eliminator 35. The eliminator 35 is formed to have substantially the same size as the gas riser 30 and in a state of covering the entire opening of the gas riser 30.

The gas riser 30 may include a distribution plate 36. In this example, the distribution plate 36 has a cross-sectional shape in which a circle and a cross shape are overlapped each other, and the cross shape is provided only outside the circle. However, a distribution plate along a vertical direction that divides the inside of the gas riser 30 into left and right, a distribution plate disposed to have a cross-shaped cross section, a tubular distribution plate having a smaller diameter than the gas riser 30, or a distribution plate having other shape can be disposed, for example. Basically, although the distribution plate 36 may have any shape as long as it is provided along the axial direction of the gas riser 30, that is, the direction in which exhaust gas mainly rises and flows, it is preferable that the distribution plate 36 has a shape that causes as little pressure loss as possible.

In this example, since the eliminator 35 is directly attached to an exhaust gas deriving port of the gas riser 30, the influence of a deviation of gas flow due to the gas riser 30 directly acts on the eliminator 35, and thus it is preferable to suppress the deviation of gas flow as much as possible.

The sealed vessel 21 is equipped with the mixer 37.

The mixer 37 is provided with the drive source 38 disposed on the top plate portion 32 of the sealed vessel 21, the driving shaft 39 passing over the exhaust gas introducing portion 26 and the partition 22 from the drive source 38 and reaching inside the absorbing liquid storage portion 24, and the mixing blades 40 provided at the front end of the driving shaft 39. The mixer 37 is disposed around the gas riser 30.

Although not illustrated, as in the prior art, a mechanism which supplies oxygen to the absorbing liquid K in the absorbing liquid storage portion 24 of the sealed vessel 21, a mechanism which supplies absorbent to the absorbing liquid storage portion 24, a solid-liquid separation mechanism used for removing the absorbing liquid K from the absorbing liquid storage portion 24 and separating solid contents such as gypsum from the absorbing liquid K are provided.

In such an exhaust gas treatment apparatus, exhaust gas is introduced into the sealed vessel 21 from the inlet duct 25 in communication with the exhaust gas introducing portion 26, and the introduced exhaust gas is ejected in the absorbing liquid in the absorbing liquid storage portion 24 from the sparger pipes 29 provided in the partition 22 as a bottom portion of the exhaust gas introducing portion 26 and is dispersed into the absorbing liquid K. At the same time, the froth layer is formed, and exhaust gas is in gas-liquid contact with the absorbing liquid K.

The exhaust gas desulfurized by gas-liquid contact is discharged to the upper space 24a above the absorbing liquid K.

Subsequently, the treated exhaust gas rises inside the gas riser 30 from the opening 23 connected to the lower end of only one gas riser 30 of the partition 22. At this time, although the flow rate in the central portion is higher than the flow rate around the central portion due to a deviation of gas flow, the ratio of the cross-sectional area S2 of the gas riser 30 to the cross-sectional area S1 of the sealed vessel 1, the ratio of the vertical length L2 of the gas riser 30 to the equivalent diameter D2 of the gas riser 30, and the ratio of the vertical length L1 of the upper space 24a of the absorbing liquid storage portion 24 to the equivalent diameter D1 of the sealed vessel 21 are determined, whereby the influence of the deviation of gas flow can be suppressed.

Further, the distribution plate 36 is provided to suppress a deviation of gas flow, whereby it is possible to prevent the flow rate of exhaust gas rising in the gas riser 30 from being increased by a deviation of gas flow.

The treated exhaust gas rises in the gas riser 30 and then reaches the eliminator 35. After droplets (mist) in the treated exhaust gas is removed by the eliminator 35, the treated exhaust gas is discharged outside the exhaust gas treatment apparatus.

According to the above exhaust gas treatment apparatus, only the single gas riser 30 is provided, so that the structure can be extremely simplified. Further, The sealed vessel 21 does not require a layer being a conventional exhaust gas deriving portion, and the number of partitions can be reduced. In addition, the height of the sealed vessel 21 is reduced to reduce the capacity of the sealed vessel 21, so that the construction cost can be reduced.

In particular, several hundred gas risers in the prior art are reduced to the single gas riser 30, so that the structure can be extremely simplified. At the same time, the gas riser 30 is projected more upward than the sealed vessel 21 to allow exhaust gas to be derived outside the exhaust gas treatment apparatus from the gas riser 30 through the eliminator 35, whereby the structure can also be simplified as described above by eliminating the conventional exhaust gas deriving portion.

According to the above, the construction cost of the exhaust gas treatment apparatus can be reduced. Further, the number of the gas risers 30 is one, whereby a constitution in which gypsum and so on adhered to the surface of the gas riser 30 is removed is simplified, and the construction cost can be further reduced.

Furthermore, the number of the gas risers 30 is one, whereby even if a constitution in which adhered gypsum is removed is simplified, a structure that gypsum can be satisfactorily reduced can be realized, and simplification of maintenance can be realized.

In this example, in the exhaust gas introducing portion 26 on the partition 22 in which a large number of gas risers have been arranged in the prior art, only the gas riser 30 is disposed in the center, so that it is possible to enter at the time of maintenance, and maintenance is extremely facilitated.

The structure that derives treated exhaust gas to the outside of the exhaust gas treatment apparatus is provided not on the lateral side of the sealed vessel 21 but on the upper side thereof by the gas riser 30. Since the eliminator 35 is disposed on the gas riser 30 and above the sealed vessel 21, the eliminator 35 is disposed at a portion occupied by the sealed vessel 21, and, at the same time, exhaust gas is derived at the portion occupied by the sealed vessel 21, so that the space efficiency of an exhaust gas treatment apparatus can be enhanced.

Further, the height of the sealed vessel 21 can be kept low because the exhaust gas deriving portion is not provided as described above. When the mixer 37 is disposed, a distance between the drive source 38 on the sealed vessel 21 and the mixing blade 40 of the absorbing liquid storage portion 24 is reduced to reduce the length of the driving shaft 39, and, thus, to reduce the weight of a portion to be driven, whereby the driving force in the drive source 38 can be reduced. When the length of the driving shaft 39 is reduced, the driving shaft 39 can be used even if the strength is reduced. The thickness of the driving shaft 39 is reduced as well as reduction in the length, or the thickness of the driving shaft 39 is reduced when the driving shaft 39 has a tubular shape, whereby the weight of the driving shaft 39 can be further reduced.

Next, an exhaust gas treatment apparatus according to a second embodiment will be described with reference to FIGS. 3 and 4.

Figure 3:
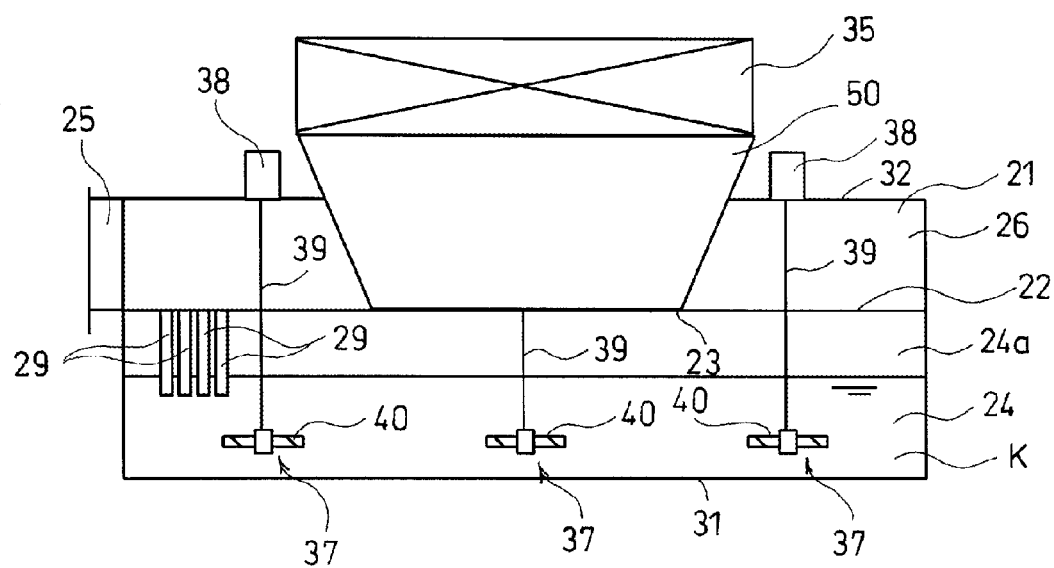
FIG. 3 is a schematic view showing an exhaust gas treatment apparatus according to a second embodiment of the present invention.

FIG. 3 is a schematic view showing an exhaust gas treatment apparatus according to the second embodiment of the present invention. FIG. 4 is a plan view showing a partition of the exhaust gas treatment apparatus according to the second embodiment.

Figure 4:
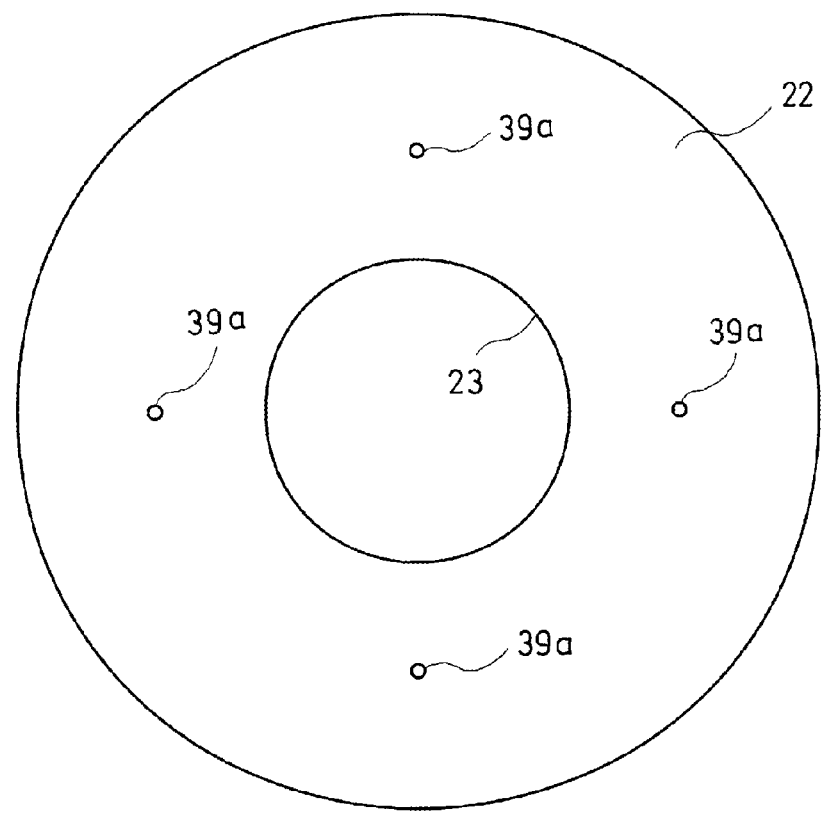
FIG. 4 is a plan view showing a partition of the exhaust gas treatment apparatus.
Figure 5:
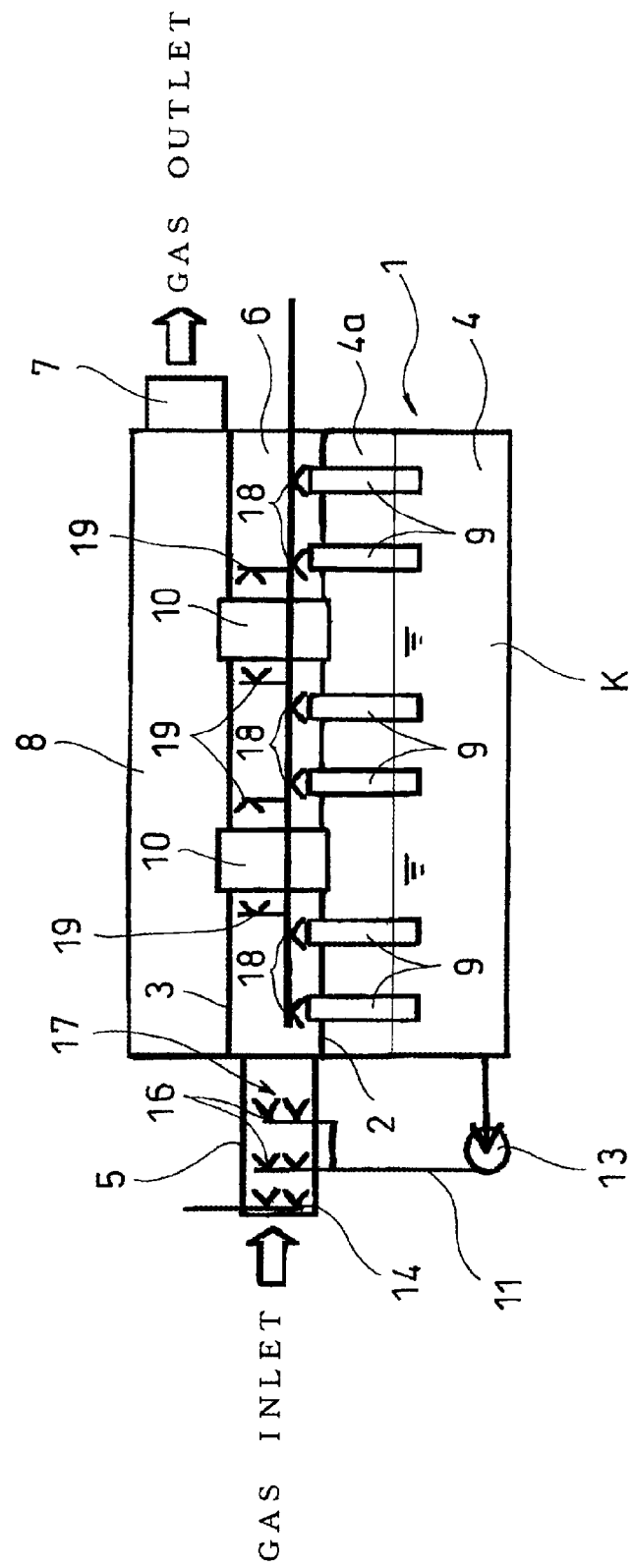
FIG. 5 is a schematic view showing a conventional exhaust gas treatment apparatus.

As shown in FIGS. 3 and 4, the exhaust gas treatment apparatus according to the second embodiment is different from the first embodiment in the structure of a gas riser 50, and other constitutions and operations are similar to those of the first embodiment. Therefore, in the following description, only a portion different from the first embodiment will be described, and other portions will be just briefly described by denoting them by the same reference numerals as those in FIGS. 1 and 2.

In the gas riser 50, the cross-sectional area of the upper end connected to an eliminator is larger than the cross-sectional area of the lower end in communication with an exhaust gas introducing portion 26. For example, the gas riser 50 has an inverted frusto-conical shape or an inverted truncated pyramid shape.

As described above, the cross-sectional area of the gas riser 50 corresponds to the amount of exhaust gas introduced per unit time and is determined corresponding to the flow rate of treated exhaust gas, from which mist can be efficiently removed by the eliminator 35, as the design speed of the eliminator 35. Accordingly, if the flow rate of exhaust gas at the upper end of the gas riser 30 provided immediately before the eliminator 35 is suitable for the eliminator 35, the flow rate of exhaust gas at the lower end of the gas riser 30 may be higher than the flow rate of exhaust gas at the upper end of the gas riser 30.

Accordingly, the cross-sectional area (equivalent diameter) of the upper end of the gas riser 30 may be larger than the cross-sectional area (equivalent diameter) of the lower end. In this case, compared with the case where the upper and lower cross-sectional areas of the gas riser 30 are the same, when the cross-sectional area of the lower end of the gas riser 30 is smaller than that of the upper end thereof, the diameter of the hole 23 of the partition 22 becomes small, so that the area capable of arranging the sparger pipes 29 of the partition 22 is increased.

In the exhaust gas treatment apparatus of the first and second embodiments, when the amounts of exhaust gas introduced per unit time are the same, the area of the partition 22 capable of arraigning the sparger pipes 29 of the partition 22 in the second embodiment may be the same as that in the first embodiment. As described above, in the second embodiment in which the diameter of the hole 23 of the partition 22 is reduced, the area of the partition 22 can be reduced while maintaining the area capable of arranging the sparger pipes 29. Namely, the cross-sectional area of the sealed vessel 21 can be reduced, and the exhaust gas treatment apparatus can be reduced in size. Alternatively, in the exhaust gas treatment apparatus, the amount of exhaust gas treated per unit time can be increased in the sealed vessel 21 with the same occupied area.

According to the above, in the exhaust gas treatment apparatus according to the second embodiment, the operational effects similar to those in the exhaust gas treatment apparatus according to the first embodiment can be obtained, and, in addition, the exhaust gas treatment apparatus can be reduced in size.

In the above example, although the cross-sectional shapes of the sealed vessel 21 and the gas riser 30 are circles, the cross-sectional shapes are not limited to the circle and may be a square or other polygonal shape. Further, although the single gas riser 30 is provided in the single sealed vessel 21, a plurality of combinations of the single partition 22 and the single gas riser 30 are connected to each other, and the single sealed vessel 21 is constituted of a plurality of pairs of the partition 22 and the gas riser 30, whereby the exhaust gas treatment capacity may be enhanced plural times. In this case, a plurality of the gas risers 30 may be provided in the single sealed vessel 21.

In this case, the number of the gas risers 30 provided in the single sealed vessel 21 is preferably not more than several ten and especially not more than twenty.

REFERENCE SIGNS LIST

K Absorbing liquid
21 Sealed vessel
22 Partition

24 Absorbing liquid storage portion
26 Exhaust gas introducing portion
29 Sparger pipe
30 Gas riser
35 Eliminator
36 Distribution plate

The invention claimed is:
1. An exhaust gas treatment apparatus, comprising:
a sealed vessel in which exhaust gas is introduced and treated;
a partition which vertically divides an inside of the sealed vessel;
an absorbing liquid storage portion which is provided under the partition of the sealed vessel and stores an absorbing liquid for desulfurization absorbing sulfur oxides from exhaust gas;
an exhaust gas introducing portion which is provided above the partition of the sealed vessel and introduces exhaust gas from outside of the sealed vessel;
a plurality of sparger pipes which are in communication with the exhaust gas introducing portion, extends inside the absorbing liquid stored in the absorbing liquid storage portion on the lower side from the partition, and ejects and disperses exhaust gas into the absorbing liquid from the exhaust gas introducing portion; and
a gas riser which is in communication with a space above the absorbing liquid in the absorbing liquid storage portion, extends upward from the partition, and passes through the exhaust gas introducing portion,
wherein the gas riser is provided to extend to the outside of the sealed vessel above the exhaust gas introducing portion, and treated exhaust gas is derived outside the sealed vessel by the gas riser,
wherein a ratio of a vertical length of an upper space of the absorbing liquid storage portion to a diameter of the sealed vessel is 0.05 to 0.2,
wherein a ratio of a cross-sectional area of the gas riser to a cross-sectional area of the sealed vessel is 0.15 to 0.40, and
wherein a ratio of a vertical length of the gas riser to a diameter of the gas riser is 0.3 to 0.1.

2. The exhaust gas treatment apparatus according to claim 1, further comprising an eliminator which is provided at an upper end of the gas riser and removes droplets from the treated exhaust gas rising in the gas riser,
wherein the treated exhaust gas is derived from the gas riser through the eliminator.

3. The exhaust gas treatment apparatus according to claim 1 or 2, wherein only the single gas riser is provided in the single sealed vessel.

4. The exhaust gas treatment apparatus according to claim 3, wherein the gas riser is joined to the partition, and a cross-sectional area of an upper end of the gas riser at which the eliminator is provided is larger than a cross-sectional area of a lower end of the gas riser in communication with an absorbing liquid storage portion under the partition.

5. The exhaust gas treatment apparatus according to claim 4, wherein the gas riser includes a distribution plate which suppresses a deviation of gas flow in the gas riser.

* * * * *